United States Patent [19]
Yamaguchi et al.

[11] Patent Number: 5,630,684
[45] Date of Patent: May 20, 1997

[54] METHOD FOR MACHINING A SCROLL MEMBER

[75] Inventors: Yukio Yamaguchi, Okazaki; Junichi Iio, Nishio; Norio Suzuki, Anjo; Kouji Mikami, Handa; Masaaki Enya, Toyohashi; Yukihisa Tsuchimoto, Kariya; Yasuhiro Miura, Kariya; Tomomi Ohno, Kariya, all of Japan

[73] Assignees: Nippondenso Co., Ltd., Kariya; Kabushiki Kaisha Toyoda Jidoshokki Seisakusho, Aichi, both of Japan

[21] Appl. No.: 428,295

[22] Filed: Apr. 25, 1995

[30] Foreign Application Priority Data

Apr. 26, 1994 [JP] Japan .................................. 6-088922

[51] Int. Cl.⁶ .......................................................... B23C 1/00
[52] U.S. Cl. .......................................... 409/132; 29/888.022
[58] Field of Search ........................................ 409/131, 132; 29/888.022, 888.02; 418/1, 55.4

[56] References Cited

U.S. PATENT DOCUMENTS

| 4,462,771 | 7/1984 | Teegarden | 29/888.022 X |
| 4,655,697 | 4/1987 | Nakamura et al. | 418/55.4 X |
| 5,105,634 | 4/1992 | Utter | 418/55.4 X |

FOREIGN PATENT DOCUMENTS

| 4011586 | 10/1991 | Germany | 409/132 |
| 3221307 | 9/1992 | Japan . | |

*Primary Examiner*—William R. Briggs
*Attorney, Agent, or Firm*—Cushman, Darby & Cushman, IP Group of Pillsbury Madison & Sutro LLP

[57] ABSTRACT

A method for machining a groove in a sealing member and the edges of the groove. A tool 24 is formed with a top portion 24 having cutter sections 23A, each defining a cutting edge 23 for machining a groove in a scroll wall of a scroll member, and a tapered part 25 having cutter sections 26A, each defining a cutting edge 26 for bevelling the edges of the groove and the edges of the scroll wall. The groove 9 and edges 11 are simultaneously machined.

8 Claims, 10 Drawing Sheets

METHOD FOR MACHINING A SCROLL MEMBER

BACKGROUND OF THE INVENTION

1. Field of the Invention

The present invention relates to a method for forming a scroll member used for a scroll type fluid machine, such as a compressor or an expander.

2. Description of Related Art

Known in a prior art is a scroll compressor having stationary and movable scroll members in a housing. Each of the scroll members is constructed of a base plate and a scroll wall which is integral with respect to the base plate. An orbital movement of the movable scroll member with respect to the stationary scroll member is obtained, while a contact is maintained between the stationary and movable scroll members. Namely, the scroll walls between the movable and stationary scroll member are in a radially contacting condition. Furthermore, the scroll wall of the stationary scroll member is under an axial contacted condition with respect to the facing surface of the base plate of the movable scroll member, while the scroll wall of the movable scroll member is under an axial contacted condition with respect to the facing surface of the base plate of the stationary scroll member.

In order to obtain a desired sealing function, the scroll walls are, at their ends facing the opposite base plates, formed with grooves into which seal rings are placed. Furthermore, the grooves are formed with outer edges which should be bevelled. The machining of the grooves is done by using a rod shaped tool (end mill) with a diameter corresponding to a width of the grooves. Furthermore, after the completion of the grooves, the bevelling of the edges is done by using a tapered tool. Due to the separate machining of the grooves and the bevelling in the prior art, the productivity during the machining is low.

SUMMARY OF THE INVENTION

An object of the present invention is to provide an improved method for machining a scroll member which is capable of overcoming the above mentioned drawbacks in the prior art.

According to present invention, a method is provided for machining a scroll member having a base plate having an axis and a scroll wall extending axially from the base plate, the method comprising steps of:

providing a toll having a first cutter part of a substantially straight, cylindrical shape and a second cutter part of a tapered cylindrical shape extending from the first cutter part;

holding the tool while causing a relative movement of the toll with respect to the scroll member in a first plane parallel to the axis of the tool and in a second plane transverse to the axis of the tool;

causing the tool to be moved in the first plane, so that the first and second cutter are engaged with an end surface of the scroll wall at respective desired depth, and;

causing the tool to be moved in the second plane, while the tool is rotated, so that a groove is formed at the end surface of the scroll wall, by the first cutter part of the tool, while edges of the groove are bevelled, by the second cutter part of the tool, simultaneously with the machining of the groove by the first cutter part.

BRIEF DESCRIPTION OF ATTACHED DRAWINGS

FIG. 9-A is a plan view of a scroll member after the completion of the machining.

FIG. 9-B is a cross sectional view of the scroll wall in FIG. 9-A taken along a line B—B.

DESCRIPTION OF PREFERRED EMBODIMENTS

Figure 1:
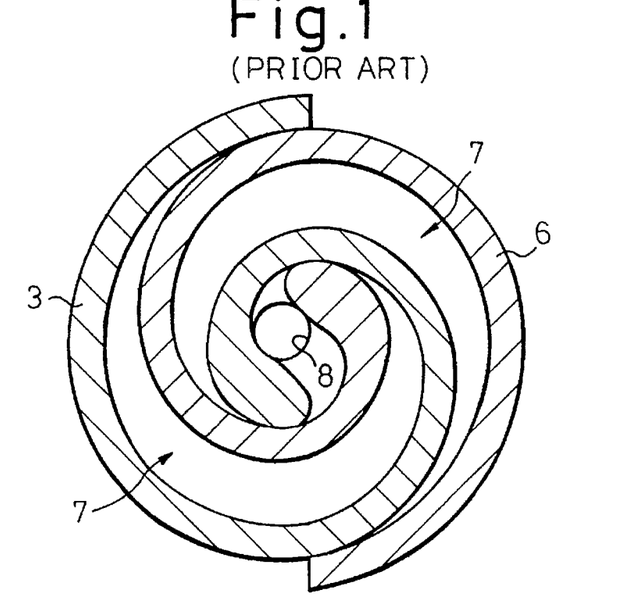
FIG. 1 is a schematic axial transverse view of a scroll compressor.
Figure 2:
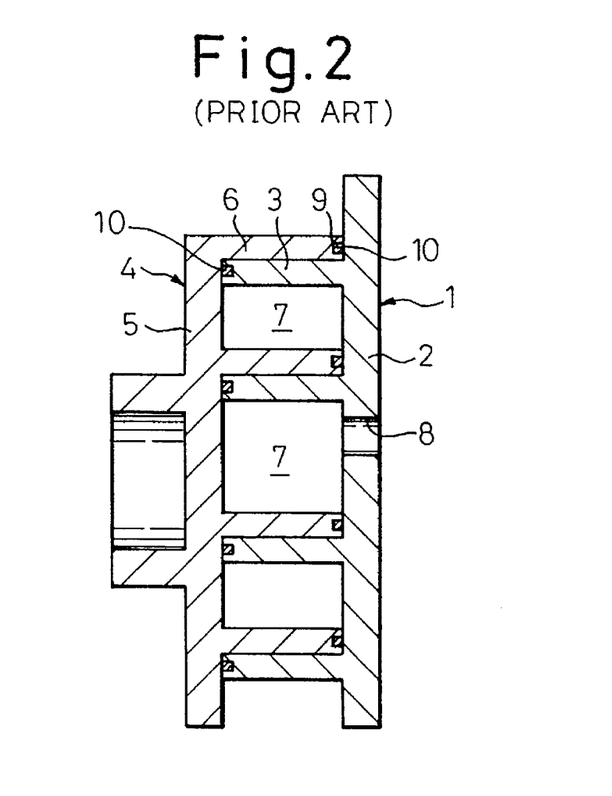
FIG. 2 is a schematic longitudinal transverse view of a scroll compressor in FIG. 1.

The problem to be solved by the present invention will be described in more detail by reference to the drawings. In FIGS. 1 and 2, a scroll compressor is conventionally equipped with a stationary scroll member 1 having a base plate 2 and a scroll wall 3, and a movable scroll member 4 having a base plate 5 and a scroll wall 6. The scroll walls 3 and 6 of the stationary and movable scroll members 1 and 4 are under a radial contact with each other. Furthermore, the scroll wall 3 of the stationary scroll member 1 is under an axial contact with the facing surface of the base plate 5 of the movable scroll member 4, while the scroll wall 6 of the stationary scroll member 4 is under an axial contact with the facing surface of the base plate 2 of the movable scroll member 1. As a result, compression chambers 7 are formed between the stationary and movable scroll members 1 and 4. A well known means is provided for obtaining an orbital movement of the movable scroll member 4 with respect to the stationary scroll member 1. During the orbital movement of the movable scroll member 4, the compression chambers 7 are moved radially inwardly, while their volumes are varied. As a result, a compression of gas in the compression chambers 7 is carried out, so that the compressed gas is discharged from an outlet 8.

In order to obtain a sealed structure of the compression chambers 7, seals 10 are arranged between the scroll wall 3 of the stationary scroll member 1 and the base plate 5 of the movable scroll member 4, and between the scroll wall 6 of the movable scroll member 4 and the base plate 2 of the stationary scroll member 1. Namely, at the ends of the scroll walls 3 and 6, grooves 9 are formed, to which the seal members 10 are fitted.

Figure 3:
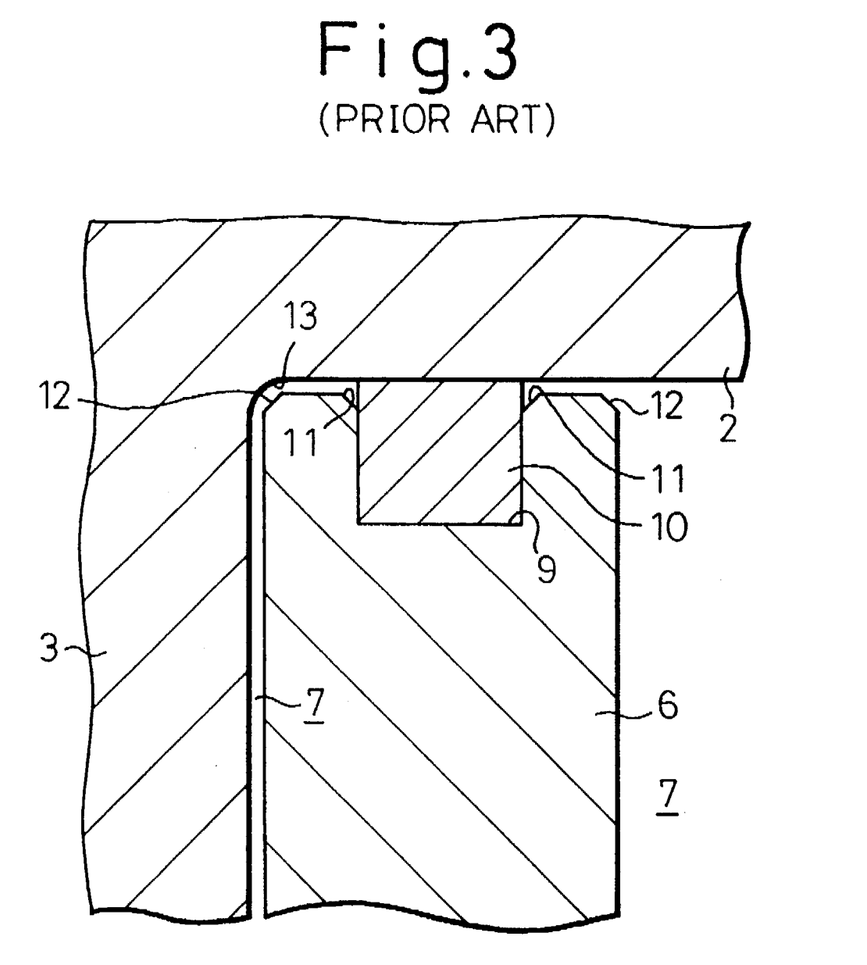
FIG. 3 is an enlarged view of a portion in FIG. 2.

As shown in FIG. 3, the groove 9 has, at its outer edges, bevelled portions 11 which allow refrigerant gas to be introduced between a bottom surface of the groove 9 and a rear surface of the seal 10, which causes the seal 10 to float in the groove 9, thereby urging the seal 10 to be sealingly contacted with the faced surface of the base plate 2 (or 5) of the other scroll member. Furthermore, the scroll wall 6 (or 3) has, at its outer edges, bevelled portions 12, thereby preventing the edges 12 from interfering with root portion 13 formed at the bottom portion of the scroll wall 3 (or 6), which is thickened in order to increase the strength of the scroll wall 3 (or 6).

Figure 4:
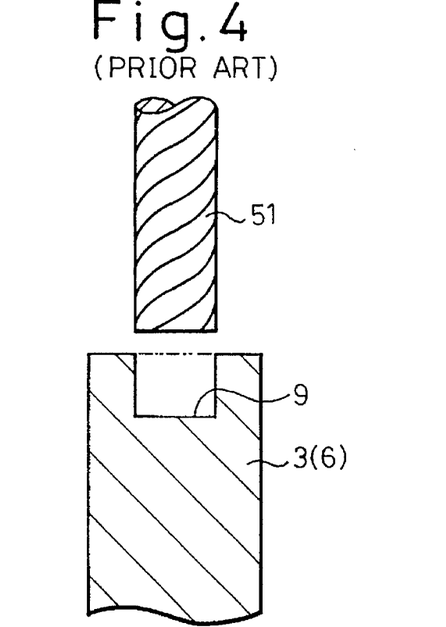
FIG. 4 schematically shows machining of a groove in a prior art.
Figure 5:
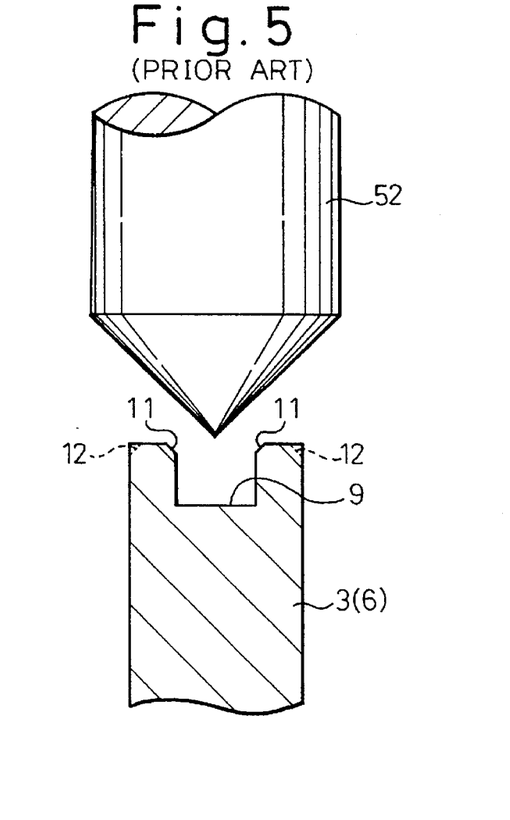
FIG. 5 schematically shows machining of edges in a prior art.

FIG. 4 illustrates how a machining of the groove 9 of the scroll wall 3 or 6 is done in the prior art. In FIG. 4, a phantom line a shows an outer profile of the scroll wall 3 or 6 after the scroll member 1 or 4 is molded. A tool (end mill) 51 of an outer diameter corresponding to a width of the groove to be obtained is, then, introduced so that the groove 9 of the desired width is machined. After the machining of the groove 9, a tapered tool 52 is, as shown in FIG. 5, introduced, so that the bevelled edged 11 are formed. Then, the tool 52 is moved, and the machining of the outer edges 12 is done as shown by a dotted line.

The machining of the groove 9 and the bevelled portions 11 are separately done by using the different machining tools 51 and 52, which causes a working time for the machining to be increased. Furthermore, the machining is complicated, due to the fact that precise positioning of the tools 51 and 51 is necessary for obtaining the desired precision for machining the seal groove 9 and the bevelled portions 11. Furthermore, a desired adjustment of the centering of the groove 9 and the bevelled portions 11 as well as an adjustment of the depth of the machining at the portions 11 is difficult from a practical view point, thereby causing the precision of the machining of the groove 9, as well as of the bevelled portions 11, to fall.

Figure 6:
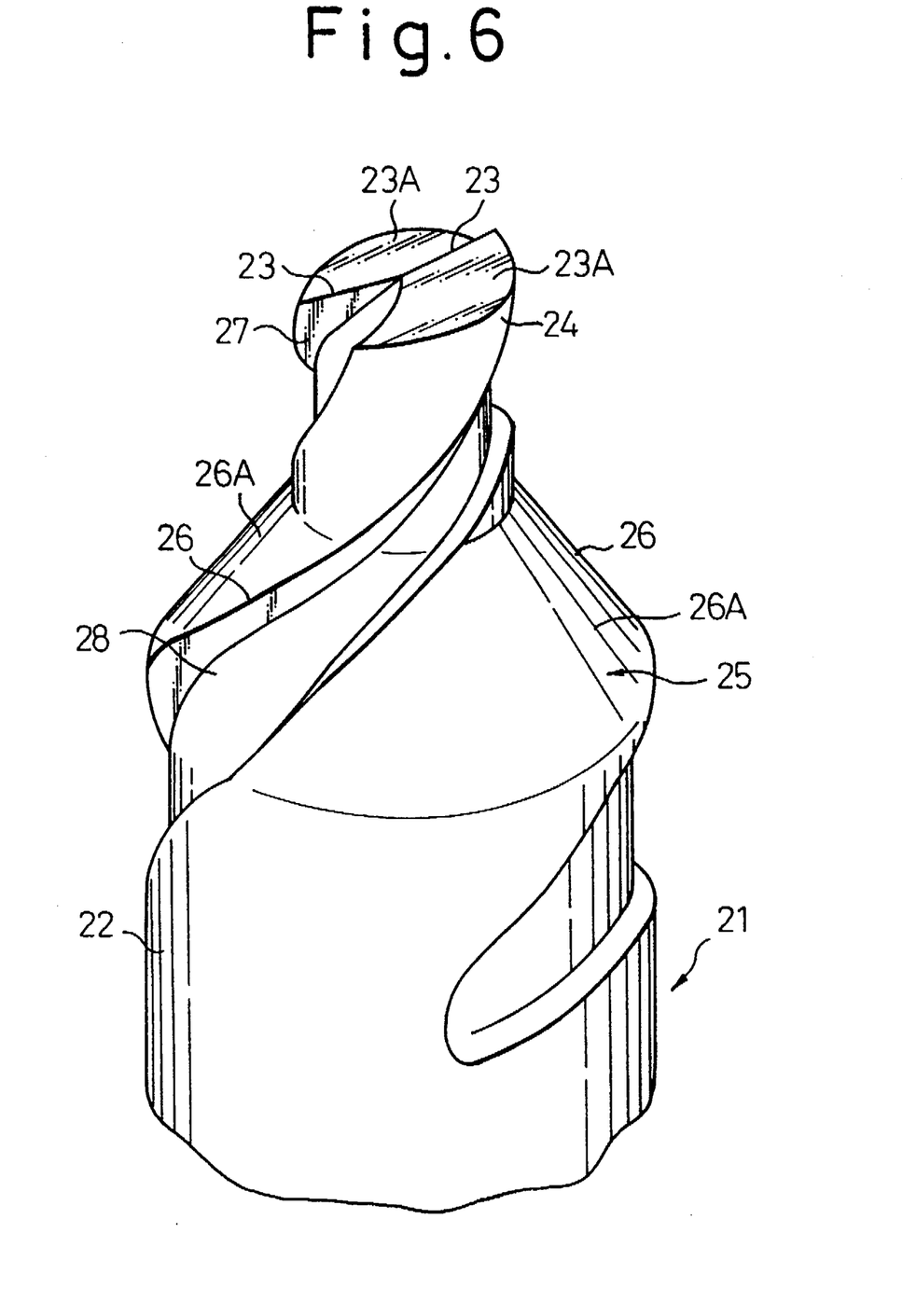
FIG. 6 is a perspective view of a tool according to the present invention.

Now, a first embodiment capable of overcoming the above-mentioned difficulty will be explained with reference to FIGS. 6 to 11. FIG. 6 shows a tool 21 for machining the groove as well as bevelled portions of a scroll member according to the present invention. Namely, the tool 21 is formed by a circular cylindrical base portion 22 of a cylindrical shape, a tapered cutter portion 25 extending from the base portion 22, and a top cutter portion 24 of a diameter smaller than that of the base portion 22 and extending from the tapered portion 25. The top portion 24 is, at its axial end surface, formed with a pair of circumeferentially spaced cutter sections 23A inclined in a circumferential direction. Each of the cutter sections 23A defines, at a circumferential end, a radially extending cutting edge 23. The tapered portion 25 located between the base portion 22 and the top portion 24 has a pair of circumferentially spaced cutter sections 26A inclined in a circumferential direction. Each of the cutter sections 26A defines, at a circumferential end, a tapered cutting edge 26. A pair of axially and spirally extending undercuts 27 extends from circumferential ends of the cutter sections 23A opposite the cutting edges 23. Furthermore, a pair of undercuts 28, which are successors to the undercuts 27, extend from circumferential ends of the cutting sections 26A opposite the cutting edges 26, thereby allowing swarf, generated during machining, to be removed.

Figure 7:
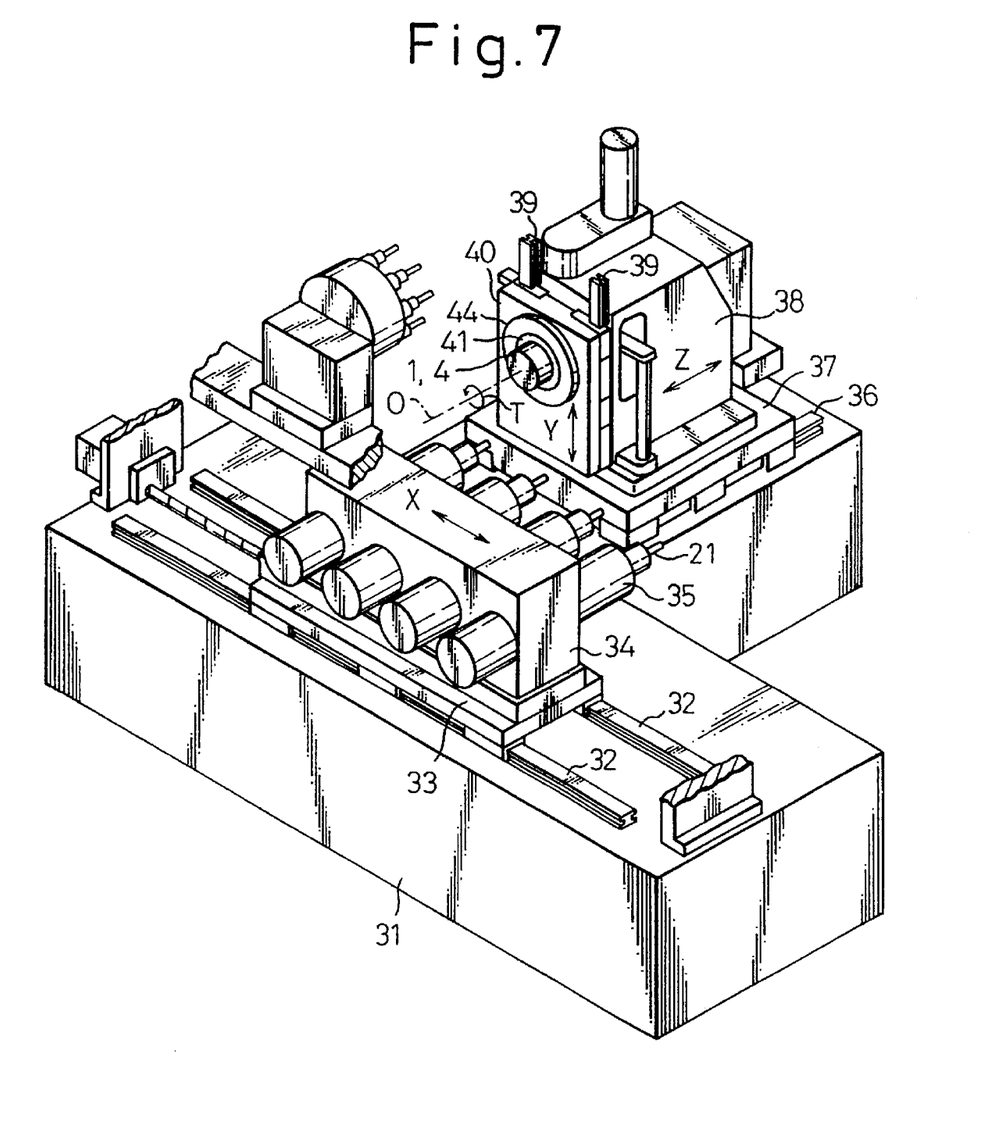
FIG. 7 is a perspective view of a device for machining the scroll member according to the present invention.

FIG. 7 shows an apparatus, for machining the scroll members 1 and 4 shown in FIG. 1, which uses the tool shown in FIG. 6. In FIG. 7, a reference numeral 31 denotes a bed, on which a pair of horizontal slide members 32, which extend in parallel along the X-axis, are mounted. A X-axis table 33 is mounted on the X-axis slides 32, so that the table 33 is reciprocately moved in a direction parallel to the axis X. A movable support 34 is fixed to the X-axis table 32, and a plurality of main axis units 35 are supported on the support 34 in such a manner that the main axis unit 35 extend in parallel in a horizontal plane. The tool 21 in FIG. 6 is mounted to one of the main axis units 35.

A pair of Z-axis slides 36 are mounted on the bed 31, so that the slides 36 extend in parallel in a horizontal plane, and extend in a direction which is transverse to the direction of the X-axis slides 32. A Z-axis table 37 is mounted on the Z-axis slides 36, so that the table 37 is reciprocated along the direction of the Z-axis. A column 38 is fixed to the upper surface of the Z-axis table 37. A pair of Y-axis slides 39 is mounted on a front vertical surface of the column 38, so that the slides 39 extend vertically in parallel along the direction of Y, which is transverse to both of the directions of X and Z. A Y-axis table 40 is connected to the Y-axis slides 39, so that the table 40 is reciprocated along the axis Y. A rotary table 44 is mounted on the front surface of the Y-axis table 40, so that the rotary table 44 is rotated about an axis O. A workpiece chuck 41 is mounted on the rotary table 40. It should be noted that the axis O of the rotation of the workpiece chuck 41 is parallel to the axis of the main axis units 35. As a result, the workpiece chuck 41 is reciprocally rotated by the rotary table 40 as shown by an arrow T.

A computer control circuit (not shown) is provided for executing a control of reciprocal linear moment of the toll 21 in the direction of X-axis, a control of reciprocal liner movement of the workpiece chuck 41 for holding the scroll member 1 or 4 in a direction of Y-axis or Z axis, and a control of reciprocal rotating movement in a direction of T. Namely, the control circuit is provided therein with numerical control programs for executing the above mentioned controls independently. Namely, upon the execution of the programs, respective control signals are issued to respective actuators (not shown).

Figure 8:
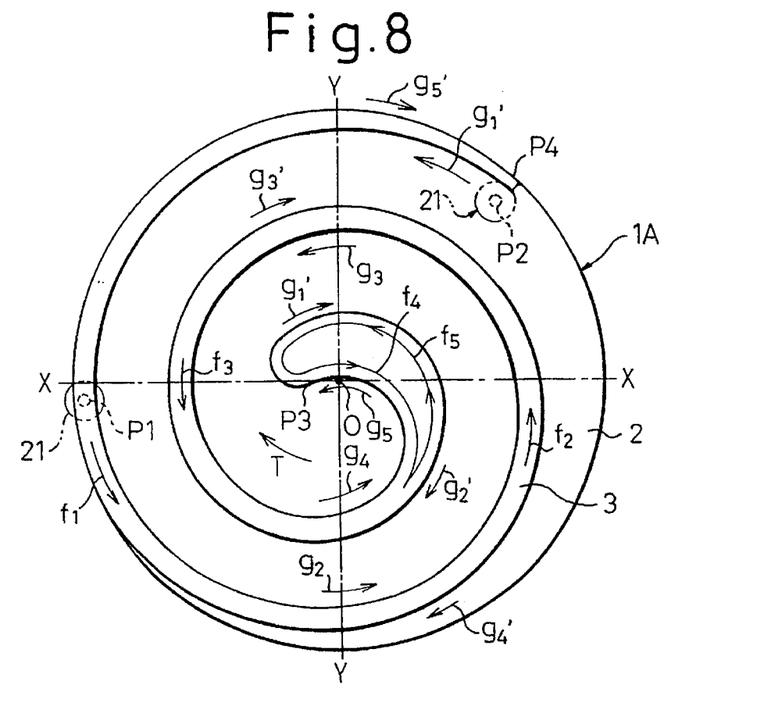
FIG. 8 is a plan view of a scroll member illustrating the machining of a groove and edges according to the present invention.
Figure 10:
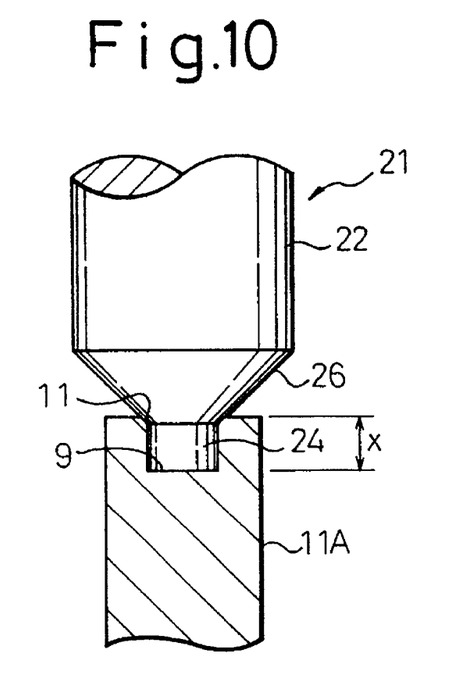
FIG. 10 shows a method of a simultaneous machining a groove as well as edges according to the present invention.

Now, a method for machining the sealing groove 9 and the bevelled portions 11 and 12 using the scroll member machining device in FIG. 7 and the tool 21 in FIG. 6 will be explained. Namely, a scroll member, as a workpiece, is attached to the workpiece chuck 41 of the machining device as shown in FIG. 7. FIG. 8 is a front view of such a scroll member, that is, for example, a stationary scroll member 1A before it is machined, which is attached to the chuck 41 in FIG. 7. While the workpiece 1A is stationary, the tool 21, which is rotating, is moved to an initial position P1 for the commencement of the machining. At the position P1, the tool 21 faces an end surface of a scroll wall 3 of the scroll member at a position located adjacent an outer periphery of the base plate 3. Then, the column 38 for carrying the table 40 carrying the rotary table 44 for carrying the scroll member 1A is moved in the direction of Z-axis in FIG. 7, i.e., a direction vertical to the paper in FIG. 8, so that the rotating tool 21 engages with the workpiece to a desired depth, as shown in FIG. 10, thereby commencing the machining.

Then, based on the numerical control programs stored in the control apparatus, a numerical control of the linear movement of the tool 21 along the X-axis is obtained. At the same time, a numerical control of the linear movement of the workpiece 1A in the Y-axis direction is obtained, while a numerical control of the rotating movement of the workpiece 1A about the axis O in the direction of T is obtained.

Figure 9:
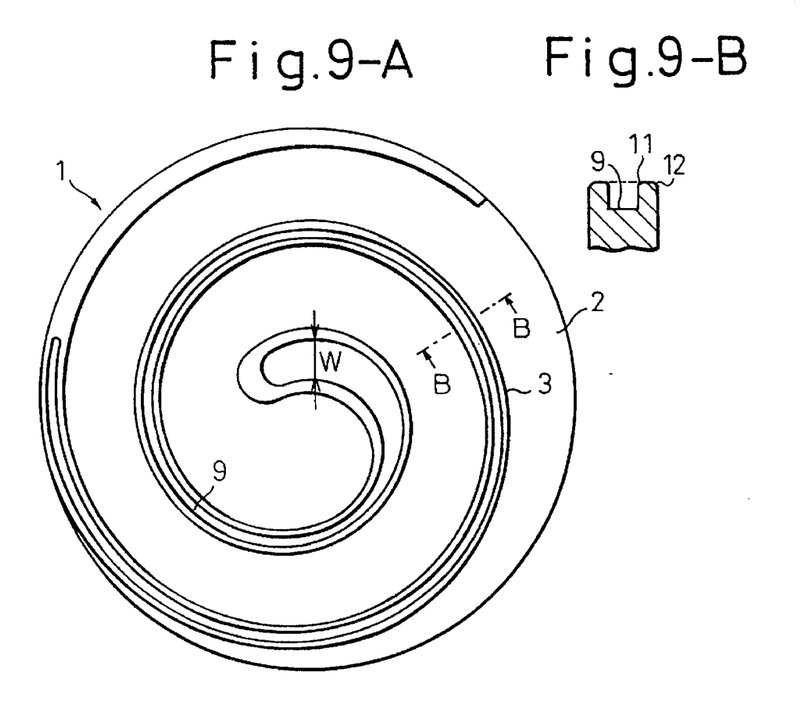

Such movements are combined, so that a relative movement of the tool 21 with respect to the scroll member 1A is obtained, in such a manner that the tool 21 is moved inwardly along the scroll wall 3 as shown by arrows $f_1$, $f_2$, and $f_3$, thereby machining the groove 9 as well the bevelled portions 11 simultaneously, as shown in FIG. 9-A. Namely, during this process, the relative position between the tool 21 and the workpiece 1A is as shown in FIG. 10 such that the top cutter portion 24 of the tool 21 is engaged with the workpiece 1A (scroll wall) for a depth x corresponding to the depth of a groove 9 to be machined, while the tapered cutter sections 26 of the tool 21 engage the outer edges of the groove 9 at a desired depth corresponding to the degree of the bevelling. As a result, a simultaneous machining of the groove 9 and the bevelled portions 11 becomes possible. Such a simultaneous machining is effective for increasing the productivity of the machining. Furthermore, an improved precision can be obtained, due to the fact that a positional relationship between the center of the groove 9 and the center of the bevelled portions 11 are always maintained constant, thereby maintaining a constant depth of the groove 9 as well as a constant degree of the bevelling at the bevelled portions 11.

Figure 11:
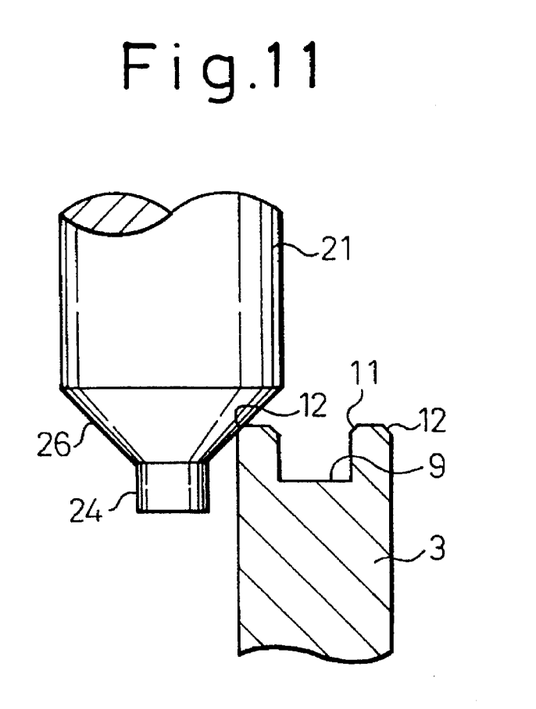
FIG. 11 is a method of a machining of outer edges of a scroll wall by a tool according to the present invention.

As shown in FIG. 8, at an inner end of the scroll wall 3 of an increased width, the tool 21 moves along a closed trajectory as shown by arrows $f_4$ and $f_5$. Such a movement of the tool 21 along the closed trajectory ($f_4$ and $f_5$) allows the width W of the groove 9 to be increased at the inner end as shown in FIG. 9-A. When a machining of the groove 9 is completed, a new relative position P2 of the tool 21 with respect to the workpiece 1A (a stationary scroll member), which is adjacent to a radially outer end of the scroll wall 3 adjacent to an outer periphery of the base plate 2, is taken, where, as shown in FIG. 11, the tool 21, at its tapered section 26, faces one of the outer edges of the scroll wall 3, which allows machining of the bevelled portion 12 to be commenced. Thus, the control circuit (not shown) executes a numerical control program for a linear movement of the tool 21 along the X-axis, a numerical control program for a linear movement of the workpiece 1A along the Y-axis, and a numerical control program for a rotating movement of the workpiece 1A in a direction T about the axis O. As a result, from the original position P2, a relative movement of the tool 21 with respect to the workpiece 1A along a trajectory as shown by arrow $g_1$, $g_2$, $g_3$, $g_4$ and $g_5$ is obtained toward a target position P3, which is adjacent to the inner end of the scroll wall 3. As a result, the machining of a bevelled portion 12 at one of the outer edges of the scroll wall portion 3 is completed.

When the relative position P3 of the tool 21 is obtained, i.e., the bevelling of the one of the outer edges is completed, a program for a numerical control for a rotating movement of the workpiece in the opposite direction T about the axis O together with a numerical control program for a linear movement of the tool 21 along the X-axis and a numerical control program for a linear movement of the workpiece 1A along the Y-axis are executed, so that, from the position P3, a relative movement of the tool 21 with respect to the workpiece 1A is obtained, along a trajectory as shown by arrows $g_1'$, $g_2'$, $g_3'$, $g_4'$ and $g_5'$ toward a target position P4, which is adjacent to the position P4, while being located opposite thereto via the scroll wall 4. As a result, a machining of a bevelled portion 12 at the other outer edge of the scroll wall portion 3 is also completed.

It should be noted that the simultaneous machining of the groove 9 and the bevelled portion 11 can be initiated at a radially inner position and finished at a radially outward position of the scroll member if it is appropriate. Similarly, the machining of the bevelling of an outer edge 12 of the scroll wall can also be initiated at a radially inner position and finished at a radially outward position of the scroll member if it is appropriate. Furthermore, the machining of the bevelled portions 12 can be initiated first, and then the simultaneous machining of the groove 9 and the inner edges 11 then follows.

Furthermore, in the description of the embodiment, the linear movement of the tool 21 along the X-axis, and the linear movement along Y-axis and the rotating movement T of the workpiece 1A (1 and 4) are combined in order to execute the machining of the groove 9 and the bevelled portions 11 and 12. Such a machining can, however, be executed without the rotating movement, i.e., by using only the linear movement of the tool 21 along the X-axis and the linear movement along Y-axis of the workpiece 1A.

In view of the above, according to the present invention, a provision of the single tool 21 is sufficient for machining the groove 9 as well as the bevelled portions 11 and 12 of the scroll member, thereby increasing a productivity of the machining, on one hand, and improving a precision of the machining, on the other hand.

In the above embodiment, the combination of the numerically controlled movements along the X-axis, Y-axis and the rotating direction T for executing the machining of the groove 9 and the bevelled portions 11 and 12 advantageous for precisely controlling a relative position between the tool and the workpiece in such a manner that tool 21 is moved along a tangential line of the involute curve to be machined.

In the above embodiment, in case where the scroll members are made from an alloy of aluminum including a large amount of silicon, it is desirable that the tool 21 is made from a ultra hard alloy, such as a tungsten carbide. In this case, it was found that a smooth machining was possible in a condition that the rotational speed of the tool 21 is 30,000 r.p.m., and that a speed of the machining is 1,000 mm/min.

Figure 12:
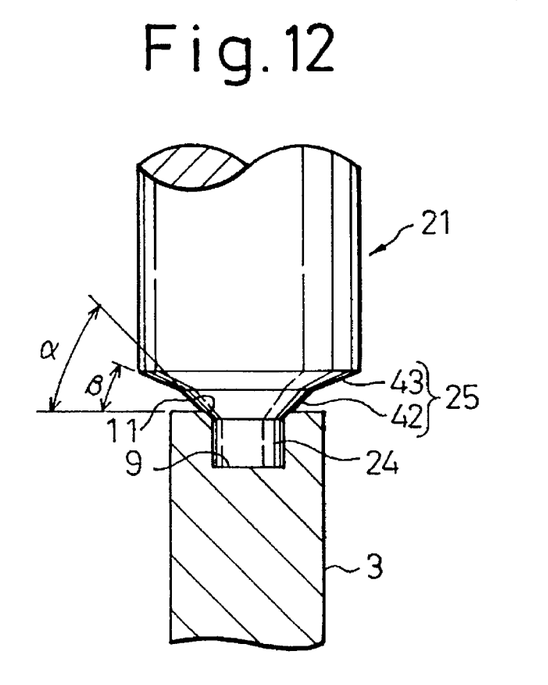
FIG. 12 is similar to FIG. 10 but illustrates a second embodiment.
Figure 13:
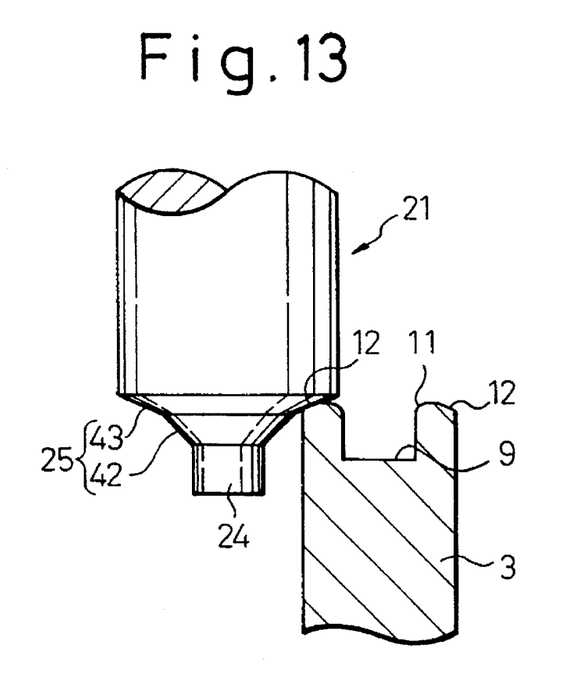
FIG. 13 is similar to FIG. 11 but illustrates a second embodiment.

Now, a second embodiment of the present invention will be explained with reference of FIGS. 12 and 13. In the embodiment, a taper cutter portion 25, formed with cutting edges, of a tool 21 is constructed by a first taper section 42 of a first taper angle $\alpha$ extending from the top portion 24 and a second taper section 43 extending from the first taper section 42 of a second taper angle $\beta$ which is smaller than the first angle $\alpha$. As shown in FIG. 12, as similar to the first embodiment, the groove 9 is machined by the top portion 24, while the bevelled portions 11 at the inner edges of the groove 9 are machined by the first taper section 42. As shown in FIG. 13, the second tapered section 43 is for machining the outer edges of the scroll wall 3, so that the bevelled portions 12 of a taper angle smaller than the taper angle of the bevelled portions 11 is obtained.

Figure 14:
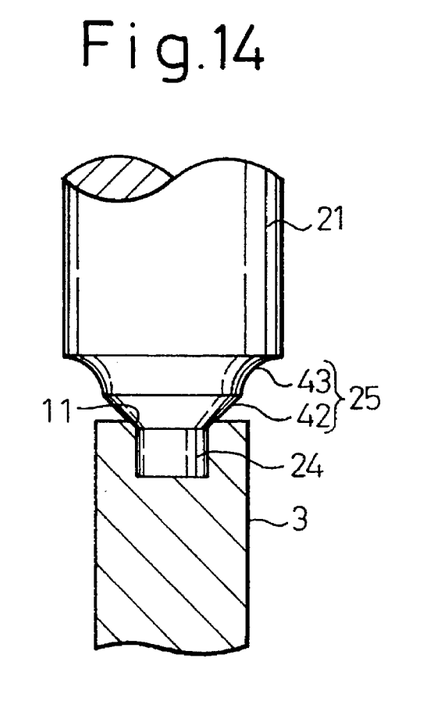
FIG. 14 is similar to FIG. 10 but illustrates a third embodiment.
Figure 15:
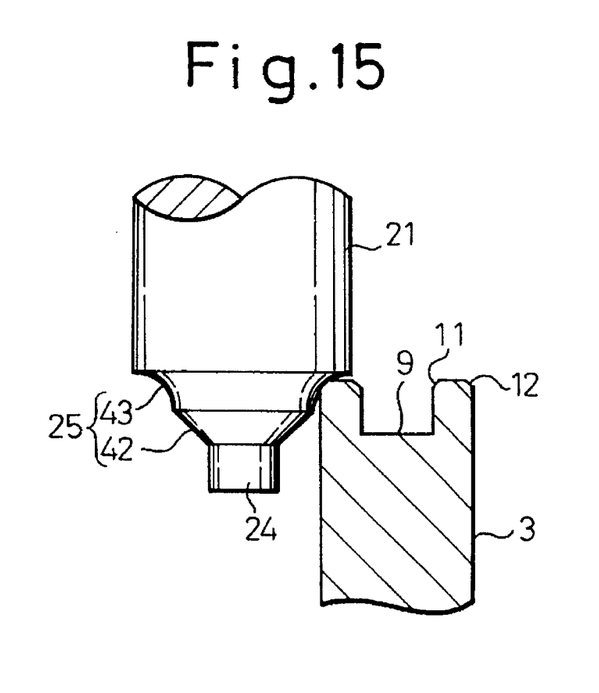
FIG. 15 is similar to FIG. 11 but illustrates the third embodiment.

In a third embodiment of the present invention shown in FIGS. 14 and 15, the tapered cutter portion 25 is constructed by a first taper section 42 forming, in a cross section, a straight line, and the second taper section 43 forming, in a cross section, an inwardly recessed arc shape. Thus, as shown in FIG. 14, the groove 9 is machined by the top portion 24, while the bevelled portions 11 at the inner edges of the groove 9 are machined by the first taper section 42 of a cross sectional shape of a straight line. Furthermore, as shown in FIG. 15, the second tapered section 43 is used for machining the outer edges of the scroll wall, so that the bevelled portion 12 of an arc cross sectional shape is obtained.

Figure 16:
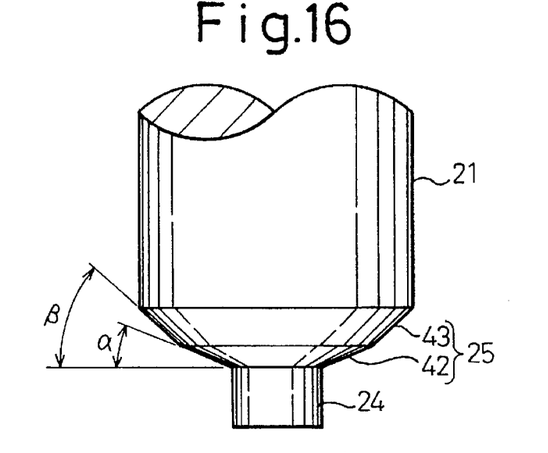
FIGS. 16 to 18 respectively show tools in other embodiments.

In another embodiment shown in FIG. 16, the tool 21 is similar to the tool in FIG. 12. However, with respect to a taper angle α of the first tapered section 42, the second tapered section 43 has a larger tapered angle β.

Figure 17:
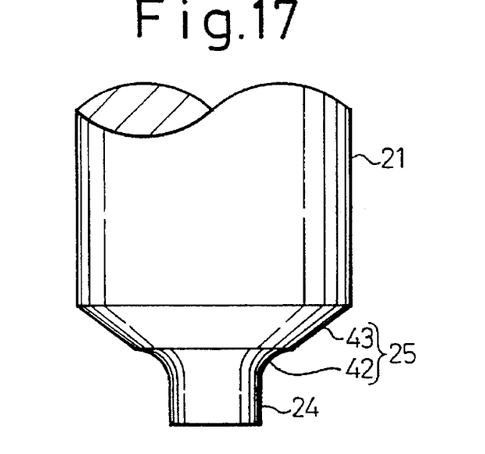

In still another embodiment in FIG. 17, the first taper section 42 is curved while the second taper section 43 is straight.

Figure 18:
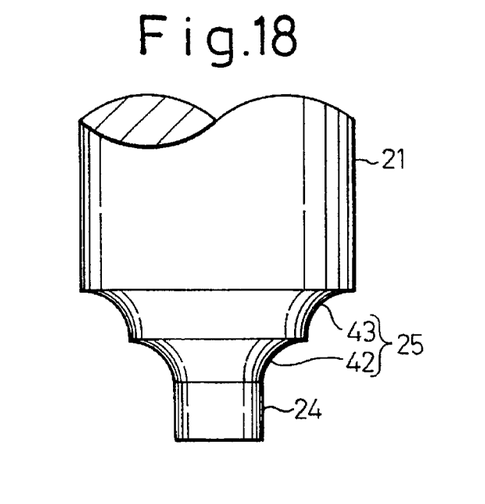

In an embodiment in FIG. 18, both of the first and second taper sections 42 and 43 are curved.

In the above embodiments, the angle α of the tapered section 26 or the first taper section 42 is, for example, 45° and can be in a range of 30° to 60°. The angle β of the second taper section 42 is in a range between 40° to 70°. When the taper angle α of the first tapered section is 45°, the taper angle β of the second taper section 42 is 55° or 30°.

According to the present invention, the top cutter part 24 of the tool 21 is not necessarily an exactly circular cylindrical shape. The shape of the top part 24 is sufficient if it can machine the groove 9 having opposite side walls which are substantially parallel.

We claim:

1. A method for machining a scroll member having a base plate having an axis and a scroll wall extending axially from the base plate, comprising steps of:

providing a tool having a first cutter part of a substantially straight cylindrical shape and a second cutter part of a tapered cylindrical shape extending from the first cutter part;

holding the tool while allowing a relative movement of the tool with respect to the scroll member in a first plane parallel to the axis of the tool and in a second plane transverse to the axis of the tool;

causing the tool to be moved in the first plane, so that the first and second cutter are engaged with an end surface of the scroll wall at respective desired depth, and;

causing the tool to be moved in the second plane, while the tool is rotated, so that a groove is formed at the end surface of the scroll wall by the first cutter part of the tool, while edges of the groove is bevelled by the second cutter part of the tool simultaneously with the machining of the groove by the first cutter part.

2. A method according to claim 1, further comprising steps of:

causing the tool to be moved in the first plane, so that the second cutter is engaged with one of the edges of the scroll wall at respective desired depth, and;

causing the tool to be moved in the second plane, while the tool is rotated, so that bevel is formed on the edge by the second cutter part of the tool.

3. A method according to claim 2, wherein a step for moving the tool for bevelling the outer edges of the scroll wall comprises the steps of:

causing the tool to be moved in the second plane, so that one of edges is bevelled by the taper section of the tool from its one end to the other end, and;

after the completion of the bevelling of the one of the edges of the scroll wall, looping the tool around an end of the scroll wall, and causing the tool to be moved in the second plane, so that the edge is bevelled by the taper section of the tool from its one end to the other end.

4. A method according to claim 3, wherein the beveling is initially done at the edge of the scroll wall located radially outwardly, and, after the execution of the looping around the end of the scroll wall, the beveling is, then, done at the edge of the scroll wall located radially inwardly.

5. A method according to claim 2, wherein the tool is provided with a second tapered section, and wherein the bevelling of the edges is done by using the second tapered section.

6. A method according to claim 5, wherein the first and second tapered sections have different values of taper angles.

7. A method according to claim 2, wherein the first and second tapered sections have different tapered shapes.

8. A method for machining a scroll member having a base plate having an axis and a scroll wall extending axially from the base plate, comprising steps of:

providing a tool having a first cutter part of a straight cylindrical shape and a second cutter part of a tapered cylindrical shape extending from the first cutter part;

providing a chuck for holding the scroll member;

providing a support of the tool;

a holding, on the support, the tool while allowing a relative movement of the tool with respect to the scroll member on the chuck in a first plane parallel to the axis of the tool;

holding, on the chuck, the scroll member while allowing a relative movement of the scroll member with respect to the tool, in a second plane transverse to the axis of the tool, by means of a relative movement along X-axis and Y-axis and a rotating movement in the second plane;

causing the tool to be moved in the first plane, so that the first and second cutter are engaged with an end surface of the scroll wall at respective desired depth, and;

causing the tool to be moved in the second plane, while the tool is rotated, so that a groove is formed at the end surface of the scroll wall by the first cutter part of the tool, while edges of the groove are bevelled by the second cutter part of the tool simultaneously with the machining of the groove by the first cutter part.

* * * * *